United States Patent

[11] 3,576,566

| [72] | Inventors | John H. Cover, Jr.<br>Woodland Hills;<br>Allister F. Fraser, Jr., Torrance; Bruno R.<br>Gaspari, Los Angeles, Calif. |
|---|---|---|
| [21] | Appl. No. | 590,561 |
| [22] | Filed | Oct. 31, 1966 |
| [45] | Patented | Apr. 27, 1971 |
| [73] | Assignee | Hughes Aircraft Company<br>Culver City, Calif. |

[54] CLOSED LOOP ANTENNA REFLECTOR SUPPORTING STRUCTURE
12 Claims, 10 Drawing Figs.

[52] U.S. Cl. .................................................. 343/705,
343/881, 343/915, 135/25
[51] Int. Cl. ....................................................... H01g 15/20
[50] Field of Search .......................................... 343/705
(S), 708, 840, 912; 244/1; 343/705, 881, 915;
135/25

[56] References Cited
UNITED STATES PATENTS
3,252,469  5/1966  Peake ........................... 135/20

| 3,266,503 | 8/1966 | Hoiness et al. | 135/1 |
| 3,174,397 | 3/1965 | Sanborn | 343/915 |
| 3,179,211 | 4/1965 | Dunlavy | 343/882 |
| 3,360,798 | 12/1967 | Webb | 343/915 |
| 3,406,404 | 10/1968 | Maier | 343/915 |

*Primary Examiner*—Eli Lieberman
*Attorneys*—James K. Haskell and Lewis B. Sternfels ABSTRACT: The supporting structure is a closed loop, such as a torus, and is useful for supporting a focusing, transmitting or reflecting mechanism, such as the mesh of an antenna. A series of arcuate segments are hinged to one another so that the whole structure may be folded in a truncated ogival configuration for stowage within a small volume, such as a vehicle shroud. Upon deployment, the segments unfold about the hinges to form the closed loop which acts as a closed beam and which tends to be self-stabilizing. A stabilized geometrical relationship also exists between the mesh and the loop. Such stabilization acts against displacement and deformation forces. Elongating struts connect the loop to a space vehicle.

PATENTED APR 27 1971

John H. Cover, Jr.,
Allister F. Fraser, Jr.,
Bruno R. Gaspari,
INVENTORS.

BY.

ATTORNEY.

PATENTED APR 27 1971 3,576,566

CLOSED LOOP ANTENNA REFLECTOR SUPPORTING STRUCTURE

The present invention relates to a supporting structure and, more particularly, to such a structure having a stabilized closed loop, which is foldable to permit stowage thereof until used. The invention further relates to a supporting structure which has a stabilized geometrical relationship between a focusing, transmitting or reflecting mechanism and the loop.

The need to utilize any specific device in a relatively inaccessible location often presents a serious problem in transporting the device to the location. It is therefore advantageous to stow such a device during transit and to deploy it into an operational condition after arrival at its destination. This transportation problem most frequently arises with respect to the positioning of devices and equipment in space, although similar problems occur with reference to inaccessible sites on the earth and on other celestial bodies. The present invention is directed to a means for transporting and deploying a closed loop structure which most conveniently takes the form of a torus, although it is to be understood that the invention is not to be restricted to a simple torus. Such a closed loop structure has many applications such as in antennas, in stabilizing mechanisms for space vehicles, and in gyroscopes.

A space antenna, for example, having a reflecting surface, preferably is designed to be lightweight, structurally sound yet simple, easily stowable until deployed, and resistant to thermal deformation as well as capable of accurate reception and transmission of signals with minimum attenuation thereof. Its weight will affect, in part, the particular orbit desired, the position in space it will take, and the amount of booster thrust required to place it in space such that a reduction in weight will reduce the amount of thrust needed. The antenna must also be structurally sound and simple to permit its proper functioning over its desired life span and to minimize the possibility of failure of any component. A further requirement is that the antenna should not thermally deform under even very great temperature differentials when different portions of the antenna are shielded from and heated by solar energy. Its structural soundness and resistance to thermal deformation are further related to the maintenance of a properly configured reflecting surface such that the signals will not be attenuated.

Well-known space antennas have not been able to adequately meet all these requirements. Some inflatable structures, for example, have a relatively high weight per unit area which necessitates a correspondingly large thrust to boost them into space. Other structures require extensive ribbing and prestressed beams which expose such antennas to the possibility of thermal distortion. Sunlight may strike one antenna portion to raise the temperature thereof and to cause expansion of the heated structural elements. Other portions, however, may be shaded from the sun to cause a cooling contraction. The expanded and contracted portions exert large forces on the antenna structure to deform it, thus distorting the antenna reflecting surface and creating transmission and reception losses. To lessen the effect of such thermal distortion, insulating material is placed over the structure; yet, such material is very fragile and is subject to breakage, especially when ribbing and beams form a part of the structure. Some antennas also require the use of complicated connections and locking mechanisms which may malfunction to prevent proper operation of the antenna.

Such well-known antennas are also limited in size because of the weight and booster power problems. An increase in the diameter of the antenna will cause a corresponding increase in weight which, however, is related to the diameter by an exponential factor rather than by a smaller multiple. Thus, current space antennas are limited in diameter.

The present invention is preferably directed to an antenna which meets the above requirements and avoids the problems existing with prior antennas. Basically, the preferred construction of the invention relates to an antenna comprising a reflecting surface joined to a ring or torus in such a manner that deformation of the torus is partly resisted by the reflecting surface. Thus, the torus and the surface are stabilized. In addition, the torus acts as a closed beam and tends to be self-stabilizing so that the forces which arise from temperature differentials counterbalance each other to prevent thermal distortions of the entire antenna.

The torus is furthermore segmented into a series of hinged arcuate segments placed in tandem. This jointed arrangement permits a folding of the antenna into a compact, truncated ogival configuration which is shaped similarly to the interior of a vehicle shroud or nose cone for efficient stowage therein. When the antenna is placed in its intended spatial position, the shroud is removed and the hinges pivot or articulate under a spring bias or other means to unfold the antenna from its stowed ogival arrangement to its deployed and operational condition.

Insulation of the antenna structure is greatly simplified because of the simple shape of the torus and its lack of ribbing and other structural members.

The antenna is secured to the space vehicle by a series of struts which are connected between the vehicle and the torus. Preferably, the struts are attached to the hinges and are expandable so that they will elongate as the torus and reflecting surface unfolds. Spring or gas means may be used to effect strut extension.

It is, therefore, an object of the invention to provide a simply constructed and lightweight supporting structure.

Another object is the provision of efficient stowage means for the structure.

Another object is to provide a structure for resisting temperature distortion.

Another object is to provide a structure which is easy to insulate.

A further object is the provision of a novel antenna supporting structure.

A further object is to provide an antenna having a stabilized geometrical relationship between its reflecting surface and the supporting structure therefor.

Other aims and objects, as well as a more complete understanding of the present invention will appear from the following explanation of an exemplary embodiment and the accompanying drawings thereof, in which:

FIG. 1 is a perspective view of an antenna constructed in accordance with the present invention showing the antenna stowed within a space vehicle shroud depicted in phantom;

FIGS. 2—4 are perspective views of the antenna during the unfolding thereof from its folded condition to its deployed or operational condition of FIG. 4;

Accordingly, an antenna 10 (see FIGS. 1—4) is secured to a spacecraft body 12 by a series of struts 14. In its stowed condition (FIG. 1) within a shroud 16, shown in phantom, the folded antenna possesses a truncated ogival shape and compactly fits within a similar interior contour of the shroud.

Figure 2:
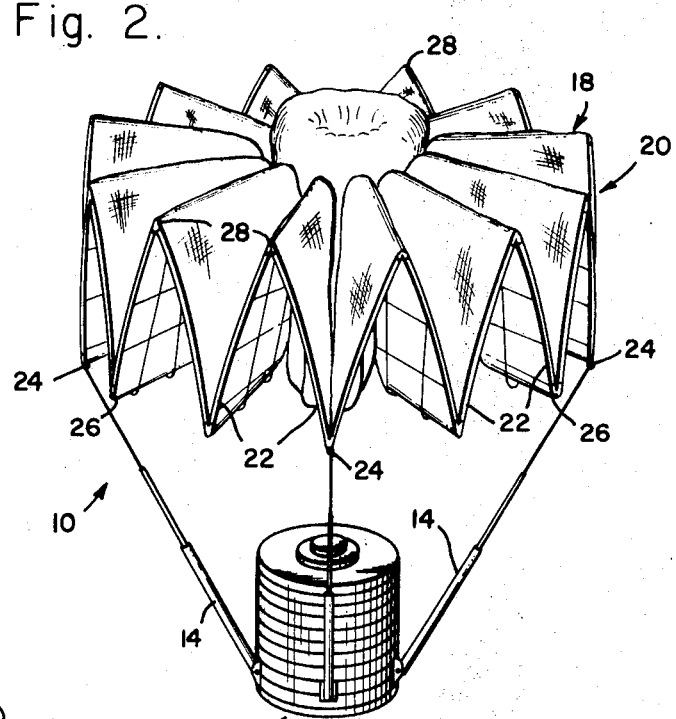
Figure 1:
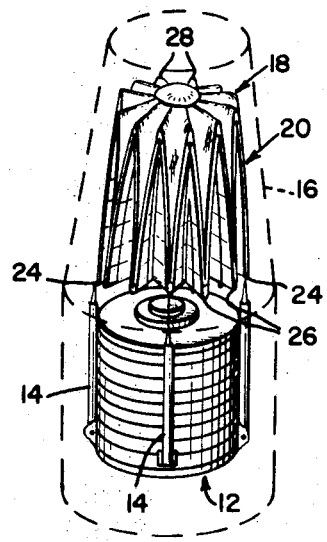
Figure 3:
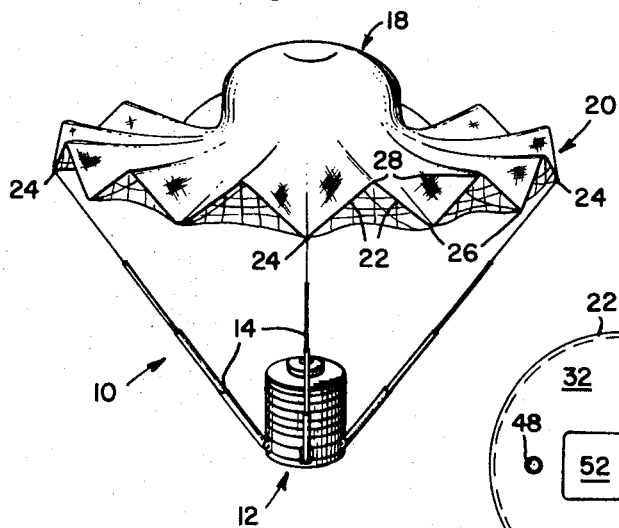
Figure 6:
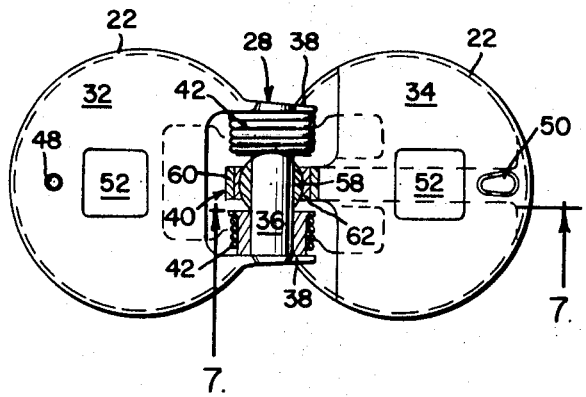
FIG. 6 is a top view of an open hinge securing two segments of the torus at the upper portion of the antenna as folded in FIG. 1.
Figure 7:
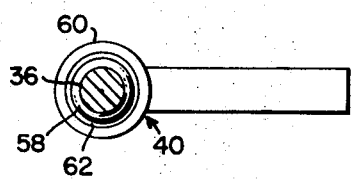
FIG. 7 is a cross-sectional view of a portion of the hinge shown in FIG. 6 taken along lines 7–7 thereof.

The antenna comprises a reflecting surface 18 which is preferably the parabolic mesh described in copending application Ser. No. 590,571, filed Oct. 31, 1966, although it is to be understood that other suitable antenna reflecting surfaces may be supported by the invention described and claimed herein. The periphery of surface 18 is secured to a ring or torus 20 (FIG. 4) which comprises a series of arcuate segments 22. Hinges 24, 26 and 28 are secured to the segments to provide a pivotal connection between adjacent segments. Hinges 24 (see also FIG. 8) are secured to the lower portions of the folded antenna as depicted in FIGS. 1—3 and are provided with extensions 30 for connection to struts 14. Hinges 26 (see also FIG. 9) are constructed similarly to hinges 24 except for the absence of extensions 30 and are also secured to different lower portions of the folded antenna. Both hinges 24 and 26 have a single plane of rotation as will be discussed more fully below. Hinges 28 (see also FIG. 6) are secured to the upper portions of the folded antenna as viewed in FIGS. 1—3 and are provided with a rotation in two planes. Thus, as antenna 10 unfolds into its deployed operational condition, as shown in FIGS. 1—4, hinges 28 permit segments 22 to be guided into the circular configuration of torus 20 by means of the rotation in two planes. Hinges 24 and 26, however, because of their rotation in only a single plane stabilize the deployment of the antenna by preventing the segments from skewing. In effect, hinges 24 and the attached struts are permitted to swing slightly about adjacent hinges 28 due to the two planes of rotation thereof to facilitate deployment and the adjustment of the segments as they expand outwardly and upwardly from spacecraft body 12. At the same time, struts 14 are extended in a controlled manner until the antenna is completely deployed.

All hinges 24, 26 and 28 (see FIGS. 5—9) comprise a pair of covers 32 and 34 each of which are secured to the ends of two adjacent segments 22 by welding or other appropriate means and which are pivotally connected by pins 36. Ears 38 and 40 respectively are integrally formed on covers 32 and 34 and are provided with holes for reception of pins 36. Springs 42 are wound about the pins and spring ends 44 (see FIG. 5) of springs 42 are biased against fingers 46 which extend from the covers. The springs exert a bias which tends to close the hinges and unfold the segments until covers 32 and 34 abut.

Figure 5:
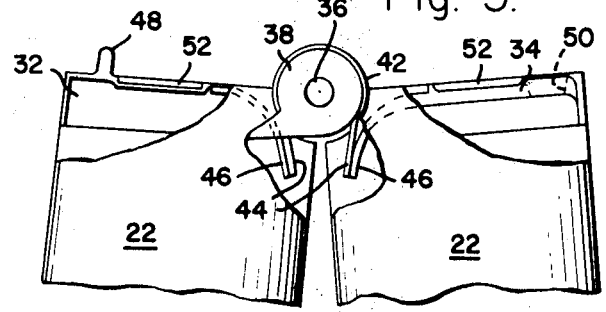
FIG. 5 is a side view of an open hinge securing two segments of the antenna torus.
Figure 4:
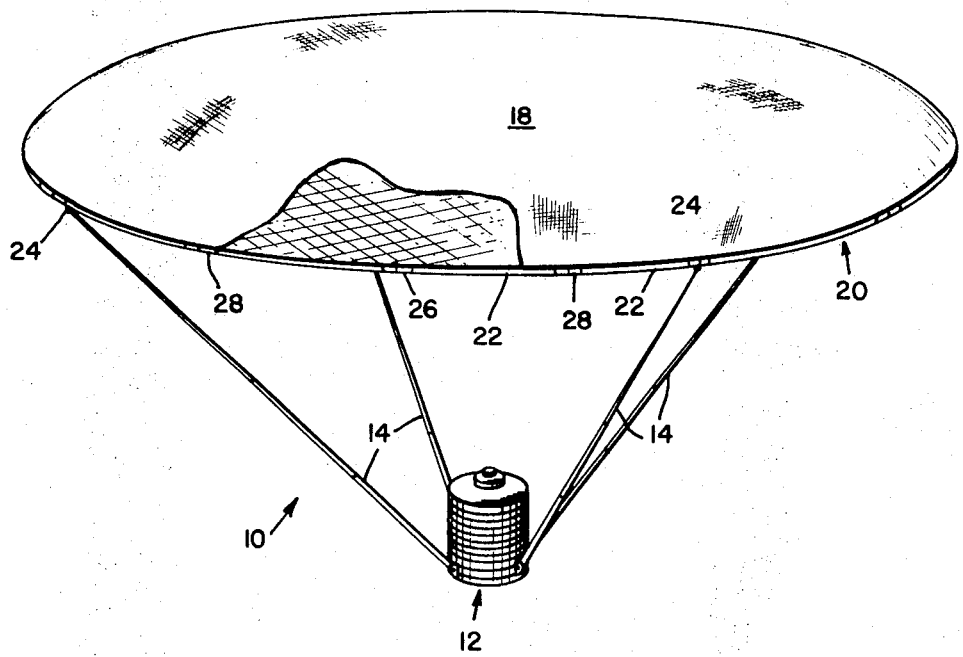

A hinge guiding device in the form of a pin 48 and a socket 50 is provided on each cover 32 and 34 to guide segments 22 into position as the antenna unfolds into its final toroidal configuration. Socket 50 is beveled as best shown in FIG. 5 to facilitate the guiding. A pair of magnets 52 are secured to each cover to lock the torus in position after having been unfolded and a further locking device may be provided between pin 48 and socket 50 to augment the locking operation of magnets 52.

Figure 9:
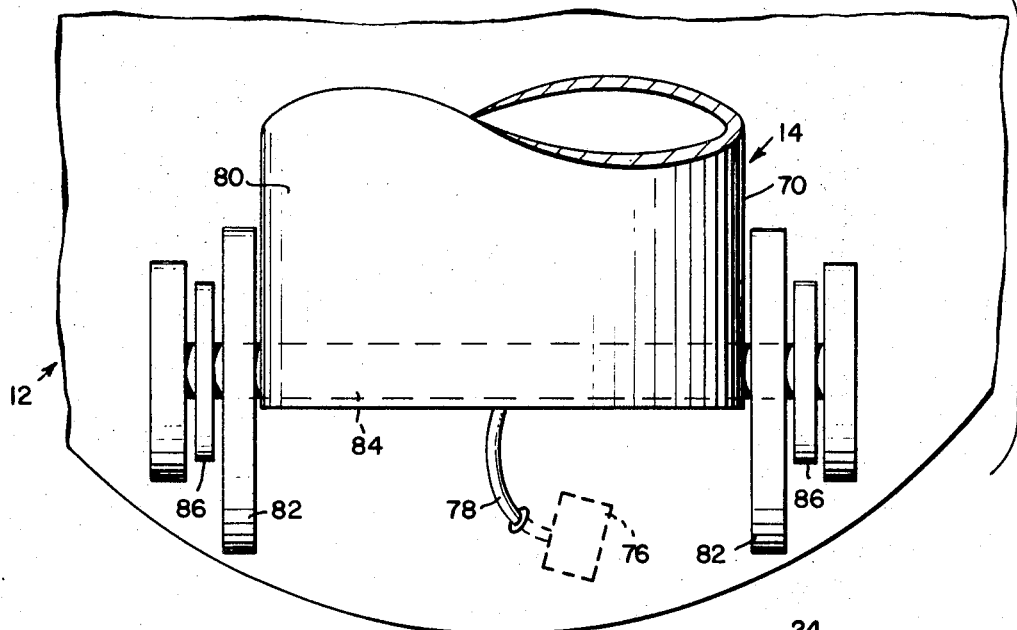
FIG. 9 is a bottom view of another open hinge similar to the hinge depicted in FIG. 8.
Figure 9:
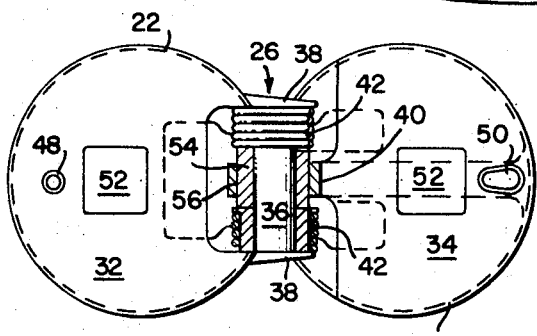
Figure 8:
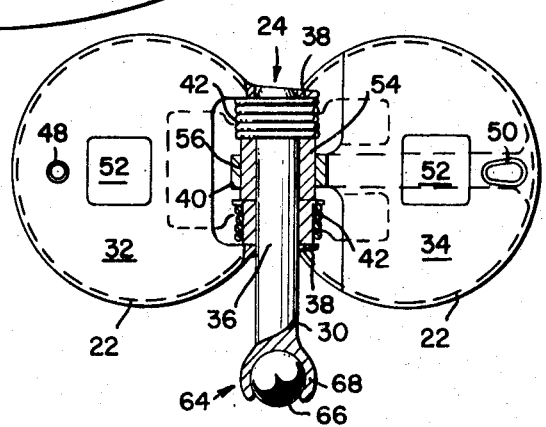
FIG. 8 is a bottom view of another open hinge securing two segments of the torus and a strut at the lower portion of the antenna as folded in FIG. 1.

Referring to FIG. 8 and 9, each lower hinge 24 and 26 includes roller bearings or a bushing 54 positioned between pin 36 and a bearing 56 on ear 40. Bushing 54 is cylindrical to prevent any wobble of the hinge and to permit rotation thereof only in a single plane.

Each upper hinge 28 (FIGS. 6 and 7) is provided with rotation in two planes by means of a ball 58 secured to pin 36. Ear 40 includes a bearing housing 60 to which is secured a bushing 62 on its interior. Bushing 62 interiorly conforms to the spherical shape of ball 58 so that cover 32 and its segment may wobble with respect to cover 34 and its segment.

Figure 10:
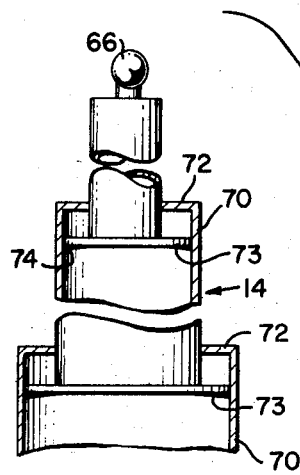
FIG. 10 is a view of a strut having portions thereof cut away.

Each strut 14 is secured to a hinge 24 (FIGS. 8 and 10) by a swivel joint 64 between extension 30 and the strut. Joint 64 comprises a ball 66 attached to strut 14 and a socket 68 on the extension for housing the ball.

The strut comprises a series of hollow sections 70 which telescope within each other so that the strut may be expanded or contracted. Flanges 72 and 73 are formed at each end of sections 70 to prevent one section from moving completely out of its adjoining section. Flanges 73 are open at their centers and the uppermost section having ball 66 is provided with a seal 74 so that gas may be injected into the strut for purposes of expansion. Such a gas is supplied from a reservoir and metering pump 76 which is housed within spacecraft body 12. A tube 78 leads from the reservoir and pump to an end section 80 of the strut for supply of the gas thereto. Gas is supplied in measured amounts so that the strut will be extended in timed relationship to the unfolding of toroidal segments 22.

End section 80 is pivotally secured to body 12 by flanges 82 on the body and a double headed pin 84 which extends through the end section. A pair of washers 86 are disposed on pin 84 to aid the pivoting of section 80.

In operation, after the spacecraft has been placed in its desired spatial position, holding clamps or bonds between struts 14 and body 12 are released as by explosive bolts. Springs 42 begin to close hinges 24, 26 and 28 to cause segments 22 to unfold into torus 20, as depicted in FIGS. 2 and 3. At the same time, gas is supplied to struts 14 from reservoir and pump 76 to cause expansion thereof. When the segments are fully deployed as a torus, the segments are arranged in tandem and reflecting surface 18 is contoured into its preferred shape as, for example, by the electrostatic means disclosed in copending application Ser. No. 590,593, filed Oct. 31, 1966 although it is to be understood that other suitable contouring methods may be employed. The toroidal configuration of ring 20 is maintained by magnets 52 and the engagement of pin 48 and socket 50. In addition, the contouring of mesh or surface 18 exerts a small force on torus 20 to aid in maintaining its shape.

If desired, small cables may be attached between each hinge and the spacecraft body and metered out as the segments unfold to further assure the uniform deployment of the antenna.

Although the invention has been described with reference to a particular embodiment thereof, it should be realized that various changes and modifications may be made therein without departing from the spirit and scope of the invention.

We claim:

1. A supporting structure for an antenna comprising a foldable and unfoldable closed loop, said loop comprising a plurality of single segments placeable in tandem when said loop is unfolded to lie in a single plane, said unfolded loop thereby acting as a closed beam, articulated joints secured between said segments and to adjoining ends thereof, means associated with said articulated joints for unfolding said loop, and a flexible electromagnetic wave reflecting surface connected to said loop.

2. A structure as in claim 1 whereby said reflecting surface is connected to said loop at the inner periphery thereof, said surface being under tension when said loop is unfolded to physically stabilize said loop against displacement and deformation forces.

3. A structure as in claim 1 wherein said segments are arcuate to form a ring, said ring and said surface being foldable into a truncated ogival arrangement and unfoldable into an operational condition.

4. A structure as in claim 1 wherein said loop is connected to a vehicle and further including a plurality of struts secured to said loop and the vehicle.

5. A structure as in claim 1 wherein said loop comprises a segmented torus.

6. A structure as in claim 1 wherein said joints comprise hinges for folding said loop and said surface in a stowed condition and for unfolding said loop and said surface into an operational condition.

7. A structure as in claim 6 wherein said means includes biasing means associated with said hinges and said segments for unfolding said loop and said surface.

8. A structure as in claim 7 further including locking means connected to said hinges to prevent folding of said loop after the unfolding thereof.

9. A structure as in claim 1 wherein said loop is connected to a vehicle and further including a plurality of extensible struts secured to said loop and the vehicle.

10. A structure as in claim 9 wherein each of said struts includes telescoping members for contraction and expansion thereof as said loop and said surface are folded and unfolded.

11. In an antenna secured to a vehicle and having an electromagnetic wave reflecting surface, a supporting structure including a closed loop lying in a single plane and thus operating as a closed beam and secured to the vehicle, and the surface integrally connected to said loop throughout the inner periphery thereof to effect therewith a physically stabilized condition against displacement and deformation forces between said loop and the surface.

12. A structure as in claim 11 wherein said loop includes arcuate segments for folding of said loop and the surface into a truncated ogival arrangement and, when arranged in tandem, for unfolding of said loop and the surface into an operational condition.